Dec. 1, 1964  E. A. BIANCHI ET AL  3,159,825
ELECTRONIC MONITORING MEANS
Filed May 1, 1961  2 Sheets-Sheet 1

INVENTORS.
EDUARDO A. BIANCHI
BY ROGER N. BLUNT

ATTORNEY

Dec. 1, 1964  E. A. BIANCHI ETAL  3,159,825
ELECTRONIC MONITORING MEANS
Filed May 1, 1961  2 Sheets-Sheet 2

3,159,825
ELECTRONIC MONITORING MEANS
Eduardo A. Bianchi and Roger N. Blunt, Rochester, N.Y., assignors to General Dynamics Corporation, Rochester, N.Y., a corporation of Delaware
Filed May 1, 1961, Ser. No. 106,948
11 Claims. (Cl. 340—248)

This invention relates to means for determining whether or not the magnitude of a certain equipment parameter falls outside prescribed upper and lower limits and, more particularly, to a device for detecting the fact that the magnitude of an alternating current signal representative of a parameter to be monitored lies within a preselected range of values.

In many instances, it is desirable to provide a warning whenever a certain operating parameter of a system exceeds predetermined limits prescribed for that parameter, and, if so, to discontinue operation of that system. The parameter to be examined—which may be, for example, pressure, temperature or neutron flux—is converted into an alternating voltage characterized in that the magnitude is a function of the magnitude of the parameter. This conversion may be accomplished by a suitable transducer well known to those working in the data handling or control engineering art.

Consider, for example, a system having a fluid conduit wherein the pressure, for satisfactory operation, should be maintained between a lower limit $P_1$ and an upper limit $P_2$. The monitoring channel is required to indicate whether this condition actually prevails and includes an appropriate transducer—in this instance, a pressure transducer. By means of this transducer, the actual operating pressure $P_0$ may be represented by a particular value of alternating current voltage which will be referred to as $V_A$. Similarly, the upper and lower limits of pressure can be represented by two fixed reference voltages which will be referred to, respectively, as $V_U$ and $V_L$. If either one of the limits $P_1$ or $P_2$ is exceeded, an output is derived from the monitoring channel which can be used either to operate on a shutdown mechanism or to indicate to the operator that the system should be shut down. Furthermore, it is desirable in many instances to provide a suitable indication in the event that some portion of the monitoring channel itself becomes defective, so that an alternate or redundant channel may be resorted to pending repair of the inoperative channel.

A similar monitoring channel would be used for each parameter to be investigated, except, of course, that the transducer would vary depending upon the parameter being converted into an alternating current voltage.

The alternating current voltage from the transducer is amplified, if necessary, by a linear amplifier; this voltage, henceforth referred to as a signal voltage or as voltage $V_A$, is supplied to a limit detector. Here, the signal voltage is compared with two preset alternating current reference voltages, the magnitudes of which are set to represent, respectively, the upper and lower limits of operation for the parameter in question. These reference voltages, which will hereafter be referred to as voltages $V_U$ and $V_L$, may be derived from a single source which, in some cases, may be the same source as that used to supply the transducer. If a single source is used, means, such as separate potentiometers, must be provided to establish the two reference voltage levels. Another characteristic of the two reference voltages $V_U$ and $V_L$ is that the phase is opposite to that of the signal voltage $V_A$; the reason for this requirement will be evident subsequently.

The signal voltage to be monitored, when of the correct polarity, will allow current to flow through a diode in a first branch of the limit detector and will charge a capacitor in that branch. Likewise, during alternate half-cycles, and when the polarity of the first reference voltage is proper, current will pass through a second diode in the first branch and will charge the aforesaid capacitor. The second diode is connected in opposition to the first diode, for reasons which will become evident later. The voltage across this capacitor will be substantially equal to the peak voltage excursion of the higher of the two voltages, that is, the signal voltage and the first reference voltage representing the upper limit of operation. Diode current flows only during a small portion of each cycle since the capacitor is more positive than the anodes of the two diodes during most of the cycles. The voltage across the capacitor falls slightly between each successive charging current pulse because of the discharge of the capacitor through a resistor in shunt therewith. If a transformer winding is connected in series with the second diode, and if the rate of discharge of the capacitor is sufficiently slow, the second diode may be connected so as to be always reverse biased when the signal voltage is larger than the first reference voltage and momentarily forward biased once during each cycle when the signal voltage is smaller than the first reference voltage. Conduction through the second diode and the transformer winding in series therewith will occur only when the signal voltage is smaller than the first reference voltage. Consequently, an absence of pulses at the output winding of the transformer will indicate that the larger reference voltage, and, hence, the upper limit of the parameter being monitored, has been exceeded. On the other hand, when the signal voltage is not larger than the first reference voltage, that is, when the value of the parameter being monitored does not exceed the established upper limit, pulses will appear at transformer output winding during each alternate half-cycle of the signal voltage.

The limit detector also includes a second branch for indicating whether or not the prescribed lower limit of operation has been exceeded. In the second branch the magnitude of the signal voltage is compared with the magnitude of a second reference voltage whose value corresponds to the lower limit to be established. The signal voltage to be monitored is applied to a circuit including a third diode, a second transformer input winding and a second capacitor shunted by a second resistor. The second reference voltage, of opposite polarity to the signal voltage, is supplied to a circuit including a fourth diode and the same second capacitor and second resistor. The second capacitor is charged during conduction of the diode and discharges through the second resistor at a relatively slow rate. The third diode is connected so as to be reversed biased when the signal voltage is less than the second reference voltage. The third diode becomes momentarily conductive when the signal voltage is larger than the second reference voltage; current then flows in the primary of the second transformer and induces an output voltage in the secondary thereof whenever said signal voltage is equal to or greater than the voltage representative of the lower limit of operation. Current will not flow in the transformer when the signal voltage is less than the lower limit of the signal voltage corresponding to the lower limit of the parameter being monitored. Consequently, an absence of pulses in the second transformer will provide an indication that the lower limit of the parameter being investigated has been exceeded.

It is conceivable, of course, that the value of the parameter under investigation may fluctuate above and below the proper operative range. This would be indicated by an absence of pulses at either of the first or second transformers.

It is possible that the absence of pulses at either or both outputs of the limit detector may be caused by a failure at any point in the monitoring channel, rather than by the parameter exceeding prescribed upper and lower values. This apparent ambiguity is not without decided advantage, however, since the absence of pulses provides a positive indication of faulty operation, whether it be in the process being monitored or in the monitoring channel itself. The presence of pulses in the output windings of the limit detector can be indicated by any one of several indicating means, such, for example, as sensitive voltmeters or cathode-ray oscilloscopes.

The diodes of the two branches of the limit detector which are in circuit with the output transformers are arranged so that conduction occurs in these two diodes during alternate portions of the alternating current cycle. Consequently, any voltage pulses which may be present at the output winding of the second transformer alternate with voltage pulses, if any, at the output winding of the first transformer. If available output pulses from the limit detector are connected to deflection means of a cathode-ray oscilloscope, the interval between successive pulses will be greater when there is but one output voltage than when there are two output voltages. Therefore, it is possible to distinguish between the condition of operation within prescribed limits and operation wherein one or both of the two operating limits is exceeded.

A bistable device is particularly adapted for use with the limit detector as an indicating means in the monitoring channel. The bistable device may be a conventional flip-flop which is set to one of two possible states when a pulse of a given polarity is applied to one input and reset to the other state by a subsequent pulse of the same polarity applied to the other input. The pulses from one output winding of the limit detector may be supplied to one input of the bistable device, while the pulses from the other output winding of the limit detector are supplied to the second input of the bistable device. If these pulses are of the same polarity, a condition which may be realized readily by proper connection of the windings of each output transformer, it is possible to determine whether or not the system is operating properly by examination of the outputs of the bistable device. When output pulses continue to occur alternately at the output windings of the two transformers, that is, when neither of the upper and lower limits are exceeded, continuous operation of the bistable device occurs and each output will continue to increase and decrease alternately in the usual manner. If, because the parameter being monitored exceeds one of the pre-established limits, a pulse fails to occur at either of the output windings of the two transformers, the bistable device no longer will be triggered into the opposite state by succeeding pulses, but will lock in one of the two states. Thus a steady output will occur at each of the output terminals of the bistable device. It should be noted that, if the monitoring channel were defective, even though the parameter being monitored is within prescribed limits, no pulses can occur at the output windings of both transformers. The usual flip-flop action will cease and the outputs of the bistable device would be relatively stable. So long as output pulses are available at the output windings of both transformers, there can be no doubt but that the process being monitored, including the entire monitoring channel, is performing satisfactorily. The system can be shut down when a steady output from the bistable device is obtained until necessary repairs can be effected.

Although the monitoring channel for the system so far has been considered to operate on the principle that an absence of pulses at one or both output terminals of the limit detector represents an unfavorable operating condition, it should be understood that the invention may also be adapted to provide output pulses from one or both output terminals of the limit detector when limits are exceeded and may be such that an absence of output pulses signifies operation within the prescribed limits. The difficulty with this arrangement is that, should a defect in operation of the monitoring channel occur, one or both limits may be exceeded without any warning being provided. If such a monitoring channel is desired, however, it can be achieved, for a given diode orientation, by connecting the output transformers in circuit with the other diode in each of the two branches.

Other objects and advantages of this invention will be made more apparent as the description progresses and after examination of the drawings wherein.

Figure 1:
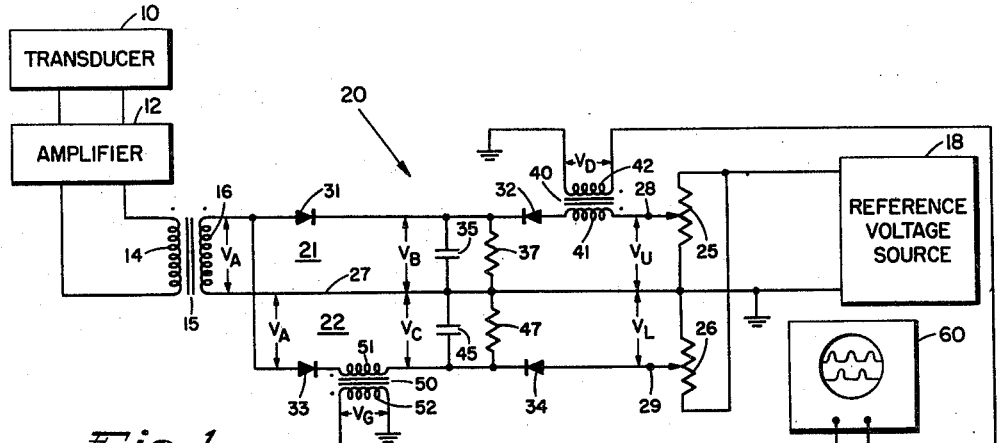
FIG. 1 is a diagram showing a monitoring device which includes a limit detector.
Figure 4:
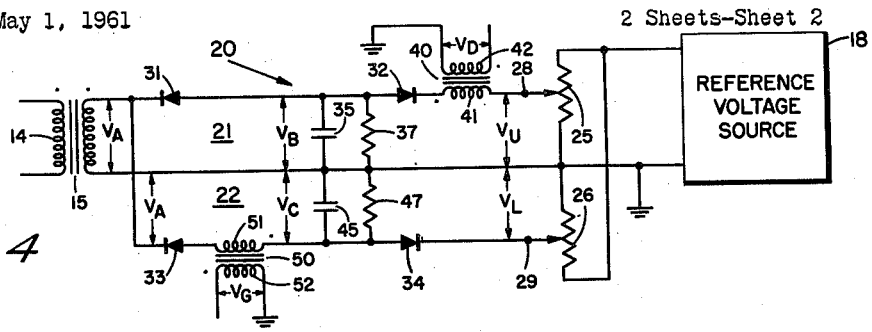
FIG. 4 illustrates a limit detector which differs from that of FIG. 1 in that all of the diodes are reversed.
Figure 6:
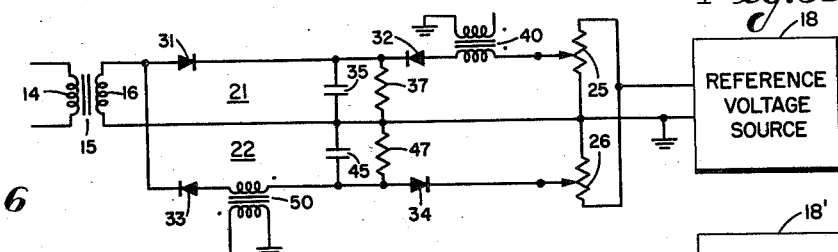
Figure 7:
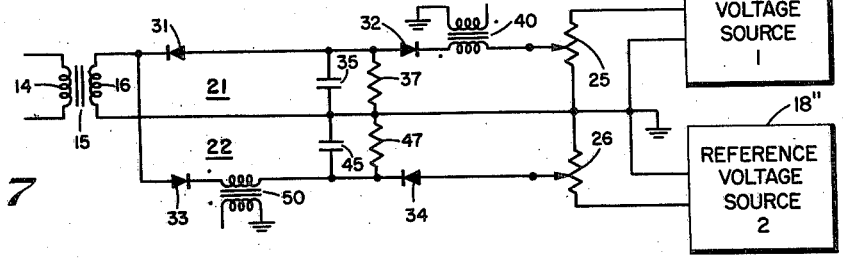
Figure 8:
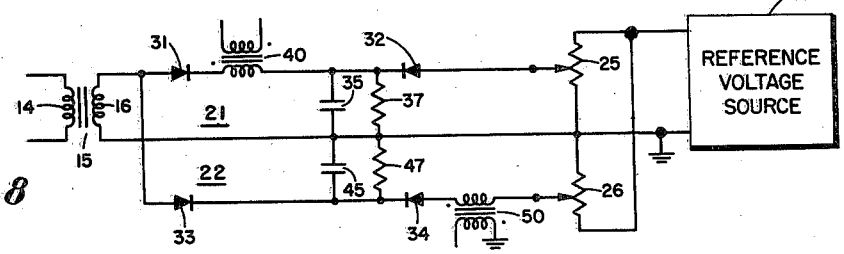

FIGS. 6 and 7 illustrate further variations of the circuits shown in FIGS. 1 and 4, wherein different diode orientations are involved; and FIG. 8 illustrates a limit detector which provides a different type indication than that of the circuits of FIGS. 1, 4, 6 and 7.

Figure 2:
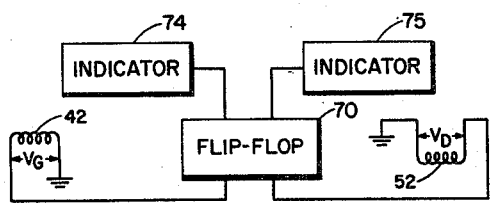
FIG. 2 is a diagram showing one manner in which the monitoring device of FIG. 1 may be modified.

Referring to FIGS. 1 and 2, a monitoring channel is shown which includes a suitable transducer 10 for converting some parameter to be evaluated, such as temperature, into an alternating current signal voltage. The latter voltage may be amplified, if necessary, by linear amplifier 12 and applied to the primary winding 14 of an input transformer 15. A voltage $V_A$ is established across the secondary 16 of transformer 15 and serves as an input voltage to limit detector 20. Detector 20 also is receptive of two fixed alternating current voltages $V_U$ and $V_L$ which may be derived from a common reference voltage supply 18 and made independently adjustable by separate potentiometers 25 and 26.

The limit detector 20 includes two branches 21 and 22 which, as indicated in FIG. 1, may have a common line 27 connected to a reference potential, such as ground.

The first branch 21 will now be described. One end of the secondary winding 16 of transformer 15 is connected by way of diode 31, previously referred to as a first diode, to one terminal of a capacitor 35. The other end of secondary winding 16 is connected over line 27 to the other terminal of capacitor 35. A resistor 37 is placed in shunt with capacitor 35. The movable arm 28 of potentiometer 25 is connected through the primary winding 41 of output transformer 40 and through diode 32, heretofore referred to as a second diode, to said one terminal of capacitor 35. Output transformer 40 further includes output winding 42 coupled to winding 41. The potentiometer 25, one end of which is at the potential of common line 27, is connected across a reference voltage supply 18 capable of providing an alternating current voltage of the same frequency but of opposite phase to the voltage $V_A$ which is present across the secondary winding 16 of input transformer 15. The magnitude of the voltage $V_U$ is determined by the setting of potentiometer arm 28; the value of this voltage $V_U$ is representative of an upper limit for the parameter under investigation. It should be understood that separate reference voltage sources, such as sources 18' and 18" of FIG. 7, may be used instead of a single source 18; it is necessary, of course, that the phase of the sources 18' and 18" each be opposite that of the signal input voltage $V_A$.

The second branch 22 of the limit detector 20 will now be described. The ungrounded end of winding 16 of input transformer 15 is connected by way of diode 33, previously referred to as a third diode, and winding 51 of output transformer 50 to one terminal of capacitor 45. The other terminal of capacitor 45 is connected to common line 27. The capacitor 45 is shunted by a resistor 47; the values of resistance and capacitance are such that a relatively long time constant is achieved. An output winding 52 is coupled to the winding 51 of output transformer 50. The ungrounded terminal of capacitor 45 is connected by way of diode 34, heretofore referred to as a fourth diode, to the movable arm 29 of potentiometer 26. The potentiometer 26 is connected across the reference voltage source 18 and the setting of arm 29 of this potentiometer determines the magnitude of the voltage $V_L$, that is, the voltage representing the lower limit for the parameter being monitored.

Figures 3A, 3C:
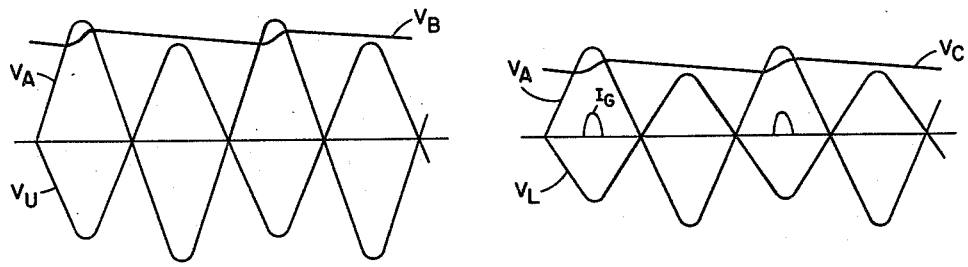
FIG. 3 are waveforms illustrating operation of the device as shown in FIG. 1.

If, as indicated in FIG. 3A, the voltage $V_A$ is greater than the voltage $V_U$, the capacitor 35 will be charged to a voltage $V_B$ nearly equal to the larger of the two voltages and diode 31 is forward biased. Diode 31 will be forward biased during that portion of the positive-going half-cycle of waveform $V_A$ when the voltage $V_B$ across the capacitor 35 is less positive than the voltage $V_A$. Because of resistance in circuit with the capacitor, however, the capacitor voltage $V_B$ does not follow exactly the induced secondary voltage $V_A$ but undergoes a variation such as shown in FIG. 3A. The voltage $V_B$ follows closely the positive peaks of the larger waveform $V_A$ because the anode of diode 31 is connected to the larger voltage $V_A$. Current will flow in diode 31 only during the relatively brief interval during which the positive peak of voltage $V_A$ is positive relative to the voltage $V_B$ across capacitor 35. Capacitor 35 discharges through resistor 37 during the interval between current pulses through diode 31. If the time constant of the circuit including capacitor 35 and resistor 37 are sufficiently long, the capacitor will discharge quite slowly. In the case where $V_A$ is greater than $V_U$, the circuit can be designed so that the capacitor voltage $V_B$ will always be more positive than voltage $V_U$. This condition is indicated clearly in FIG. 3A. Since the voltage $V_U$ at the anode of 32, when $V_A$ is greater than $V_U$, is always negative relative to the voltage $V_B$ at the cathode, diode 32 will not conduct; hence, no charging current will flow through winding 41 of output transformer 40 and no voltage $V_D$ will be induced in output winding 42 of transformer 40.

Figures 3B, 3D:
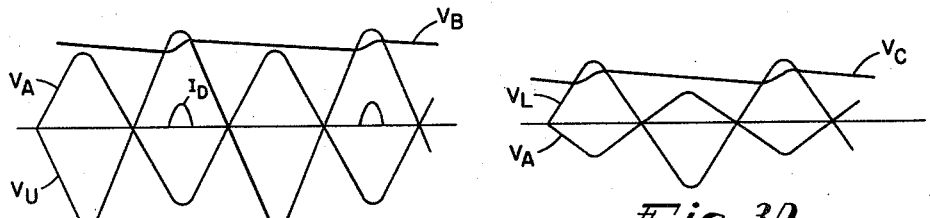

If, however, as illustrated in FIG. 3B, the voltage $V_A$ is less than $V_U$, it can be shown that the voltage $V_B$ across capacitor 35 will charge to a value almost equal to the peak value of the larger of the two voltages, that is, voltage $V_U$. The voltage $V_B$ will follow the positive peaks of the waveform $V_U$ since the anode of diode 32 is connected to the larger voltage $V_U$. The voltage $V_U$ at the anode of diode 32 will briefly become positive relative to voltage $V_B$ at the cathode and diode 32 will be forward biased long enough to pass a current pulse $I_D$. This current pulse flowing through winding 41 of output transformer 40 will induce an output voltage pulse $V_D$ in the output winding 42 of transformer 40. It now becomes evident that an absence of output pulses in $V_D$ in output winding 42 of transformer 40 will result whenever $V_A$ is greater than $V_U$. This is another way of saying that the absence of output pulses $V_D$ is indicative that the parameter being examined has reached a value higher than an upper limit, represented by voltage $V_U$. So long as output voltage pulses $V_D$ are present, on the other hand, $V_A$ is either equal to or less than $V_U$, that is, the magnitude of the parameter being monitored is satisfactory.

The second branch 22 of limit detector 20 provides means for indicating when the magnitude of the investigated parameter falls below a lower limit. The analog representation is reference voltage $V_L$. This voltage is of the same polarity as reference voltage $V_U$, but necessarily of lesser magnitude. If voltage $V_A$ should be greater than voltage $V_L$, as shown in FIG. 3C, capacitor 45 will be charged to a voltage $V_C$ slightly less than the peak value of the larger of the two voltages. The charging of capacitor 45 occurs whenever the voltage $V_A$ at the anode of diode 33 is positive with respect to the voltage $V_C$ at the cathode of diode 33. The voltage $V_C$ follows the positive peaks of waveform $V_A$ since the anode of diode 33 is connected to the larger of the two voltages, that is, $V_A$. This condition exists for a brief period each cycle, and current pulses $I_G$ pass through diode 33 and winding 51 of transformer 50. A voltage pulse $V_G$ then is induced in the output winding 52 of output transformer 50. The capacitor 45 discharges slowly through resistor 47 during the periods between current pulses $I_G$.

If the voltage $V_A$ should be less than reference voltage $V_L$, as shown in FIG. 3D, it is evident that capacitor 45 will charge to a value $V_C$ close to the peak value of the voltage $V_L$—the larger of the two voltages. The voltage $V_C$ across capacitor 45 will follow the positive peaks of waveform $V_L$ since the anode of diode 34 is connected to the larger voltage $V_L$. If the rate of discharge of capacitor 45 is sufficiently slow, voltage $V_C$, that is, the voltage at the cathode of diode 33, will always be more positive than the voltage $V_A$ at the anode of this diode. Consequently, diode 33 will never conduct and at no time will there ever be any voltage at $V_G$ at the output transformer 50. The presence of pulses $V_G$ at transformer 50 indicates that the voltage $V_A$ is greater than the voltage at $V_L$; that is, the magnitude of the parameter being monitored is equal to or less than the lower limit established by fixed voltage $V_L$. If, however, no pulses $V_G$ appear at transformer 50, the voltage $V_A$ is less than $V_L$ and the magnitude of the parameter being monitored is less than the prescribed lower limit.

It now becomes evident that a limit detector is available which indicates that the magnitude of a parameter under investigation is either higher than a prescribed upper limit or lower than a prescribed lower limit, whenever pulses at one or the other output means are absent. Operation not in excess of these limits is indicated by the fact that output pulses occur alternately at both output means.

The pulses $V_D$ and $V_G$ may be supplied to the deflection means of a conventional double beam cathode-ray oscilloscope 60, as shown in FIG. 1. If pulses are available at both output means, that is, when satisfactory operation exists, pulses will be displayed on the cathode-ray tube screen on each beam. If the monitoring channel is faulty, pulses will not be available at either of the output means and no display will appear on the face of the cathode-ray tube.

An alternative indicating means is shown in FIG. 2 wherein the voltages $V_D$ and $V_G$ at the output windings 42 and 52 of limit detector 20 are applied to opposite input terminals of a flip-flop 70. The operation of such flip-flops is well known. Briefly, conduction in either stage keeps the other stage cut off. If a positive-going trigger pulse is applied to the first stage, the output voltage at the second stage increases, while the output voltage at the triggered stage is low. This condition remains, regardless of the number of such pulses applied to the first stage, until a positive-going pulse is applied to the second stage. At this time, the second stage becomes conductive and the first stage cut off; the output voltage of the first stage now becomes high while the output of the second stage decreases. So long as pulses $V_D$ and $V_G$ are applied alternately to the first and second stages of flip-flop 70, the outputs at either of the two stages continue to flop between relatively high and relatively low values. Indicating means 74 and 75, such as indicating lamps, connected in the output circuits of the two stages will indicate whether or not the flip-flop action is continuing. A steady indication at the outputs of flip-flops 70 can mean only that pulses $V_D$ and $V_G$ are not being supplied in alternation from the respective output transformers 40 and 50 of the limit detector 20. Thus, an indication is provided either that one of the prescribed limits of the parameter under investigation has been exceeded or that a fault has developed somewhere in the monitoring channel which includes the limit detector. In either case, the operator would be alerted that an abnormal situation existed.

Figure 5A:
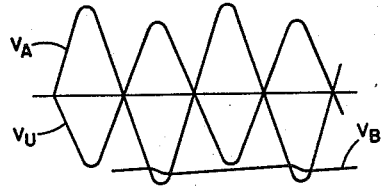
FIG. 5 are waveforms illustrating the manner of operation of the device of FIG. 4.
Figure 5C:
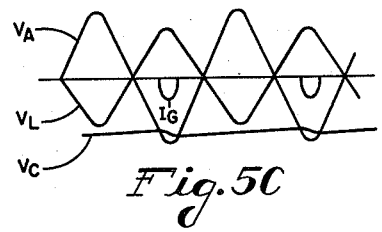
Figure 5D:
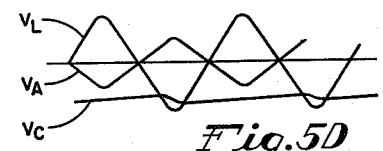

In FIG. 4, a modification of the limit detector 20 of FIG. 1 is shown, with the operation being illustrated by waveforms of FIG. 5. The limit detector 20 of FIG. 4 differs from that of FIG. 1 in that all of the diodes have been reversed. The same reference numerals will be used, however, to designate the diodes of FIG. 4 which correspond to those of FIG. 1.

If the voltage $V_A$ is greater than voltage $V_U$, as shown in FIG. 5A, the capacitor 35 will charge to a value near the peak value of $V_A$. Since the polarity of diode 31 of FIG. 4 is opposite that of diode 31 in FIG. 1, the voltage $V_B$ across capacitor 35 will appear as in FIG. 5A; that is, the voltage $V_B$ will follow closely the negative excursions of the larger voltage $V_A$. Examination of FIG. 5A indicates that voltage $V_B$ is always negative with respect to voltage $V_U$. Consequently, diode 32 is reverse biased and there will be no current flow through diode 32 and winding 41 of transformer 40 to induce a voltage $V_D$ in the output winding 42. If the voltage $V_A$ is less than the voltage $V_U$, as shown in FIG. 5B, there will be brief periods of conduction of diode 32 whenever the voltage $V_B$ at the anode of diode 32 is positive relative to the voltage $V_U$ at the cathode of this diode. Current flow through diode 32 and transformer winding 41 will induce voltage pulses $V_D$ in the output windings 42 of transformer 40. With reference to FIG. 5C, it should now be evident that diode 33 will conduct when voltage $V_A$ at the cathode of diode 33 is negative with respect to the voltage $V_C$ at the anode of this diode. During this period, current pulses $I_G$ are produced and a voltage $V_G$ is available at transformer 50. This condition can occur only when voltage $V_A$ is greater than voltage $V_L$.

The circuit 20 of FIG. 4, like that shown in FIG. 1, provides alternating pulses at both output windings when the parameter being monitored is within prescribed limits and absence of pulses at the output winding corresponding to the limit being exceeded. It should be noted that the current pulses $I_D$ and $I_G$ in FIGS. 5B and 5C are negative as contrasted with the positive pulses $I_D$ and $I_G$ of FIGS. 3B and 3C. This poses no problem, however, since the connections of the output transformers 40 and 50 can be arranged to provide either positive or negative output pulses at both transformers.

In FIGS. 6 and 7, further modifications of the limit detector of FIG. 1 are shown. In FIG. 6, diodes 31 and 32 are connected as in FIG. 1 but diodes 33 and 34 are reversed. In FIG. 7, diodes 33 and 34 are connected as in FIG. 1 but diodes 31 and 32 are reversed. It can be shown that each of the circuits of FIGS. 6 and 7 provide output pulses only (1) when the upper and lower limits are not exceeded, and (2) when no failures are present in the monitoring channel.

It should be noted, at this point, that in each of the circuits described, the polarity of the diodes 31 and 32 in branch 21, as well as the polarity of the diodes 33 and 34 in branch 22, is opposite. This arrangement obviates the possibility of conduction occurring through both diodes of a given branch simultaneously and thus prevents interaction between the two branches of the limit detector. This reverse connection of the diodes in each branch also is necessary to insure a clear-cut "pulse" versus "no-pulse" operation of the limit detector.

As mentioned previously, the limit detector 20 may be arranged to provide pulses at both output transformers 40 and 50 whenever operation is outside prescribed limits and to provide pulses at one only of the output means when operation within prescribed limits occurs. A typical circuit for such indication is shown in FIG. 8. It will be noted that the diodes in FIG. 8 are arranged exactly as in FIG. 1; however, the diode 31 in branch 21 now is in circuit with transformer 40, instead of diode 32; moreover, transformer 50 in branch 22 is in circuit with diode 34 instead of diode 33. The diode 31 in circuit with output transformer 40 is of opposite polarity to the diode 32 which was in circuit with transformer 40 in FIG. 1. When the signal voltage $V_A$ is greater than the reference voltage $V_U$, voltage $V_A$ momentarily becomes positive relative to voltage $V_C$ across condenser 35. Diode 31 thus is biased for condition of current pulses which pass through winding 41 and induce voltage pulses $V_D$ in the winding 42 of transformer 40. The voltage curves of FIG. 3 are applicable also for the circuit of FIG. 8. However, the current flow in transformer winding 41 in the circuit of FIG. 8 is dependent upon the relative polarity of the voltages $V_B$ and $V_A$ applied to diode 31, rather than upon the voltages $V_B$ and $V_U$ applied to diode 32, as in the circuit of FIG. 1. When the voltage $V_A$ is less than $V_U$, then voltage $V_B$ is always positive with respect to voltage $V_A$ and diode 31 cannot conduct. Consequently, no pulses $V_D$ are available at transformer 40. It will be noted that the diode 33 now associated with output transformer 50 is connected oppositely to the diode 34 associated with transformer 50 in FIG. 1. When voltage $V_A$ is greater than voltage $V_L$, the voltage $V_C$ is always positive relative to voltage $V_L$. Diode 34 is reversed biased at all times and no current flows through winding 51 of transformer 50; hence, no output pulses $V_G$ appear at output transformer 50. If voltage $V_A$ is less than voltage $V_L$, then the latter voltage becomes positive with respect to voltage $V_C$ during the brief portion of the positive-going half-cycle of waveform $V_L$. Current pulses then flow through winding 51 and induce output voltage pulses $V_G$ in transformer 50. The limit detector 20 thus provides pulses at output means 40 or 50, depending upon which limit is being exceeded. During normal operation, no output pulses are available at the limit detector output means.

It can be shown that this type of indication is also available if the transformers 40 and 50 of FIGS. 4, 6 and 7 are shifted in the circuit in the same manner that the transformers 40 and 50 of FIG. 1 have been shifted to derive the circuit at FIG. 8. For example, the output transformer 40 in FIG. 4 would be removed from its present position and inserted in series with the diode 31. Likewise, the transformer 50 of FIG. 4 would be shifted to be in series with diode 34. In the interest of brevity, however, these circuit modifications are not shown in the drawing.

What is claimed is:

1. A device for indicating whether or not a system parameter has exceeded prescribed operating limits comprising transducer means for converting said parameter into an alternating current signal voltage of magnitude proportional to the magnitude of said parameter, detector means having first and second branches each receptive of said signal voltage, said first branch including input means for receiving a first alternating current reference voltage whose magnitude is adjusted to a value representative of an upper limiting value for said parameter, said second branch including input means for receiving a second alternating current reference voltage of magnitude representative of a lower limiting value for said parameter, the phase of said reference voltages being opposite to that of said signal voltage, each of said branches further including unilateral conducting means and a capacitor coupled to said signal input voltage and to the corresponding reference voltage whereby a potential is established across said capacitor, each branch including an output means connected in series with said unilateral conducting means, said unilateral conducting means in said first branch being reverse biased when the magnitude of the signal voltage is greater than that of said first reference voltage, said unilateral conducting means in said second branch being reverse biased when the magnitude of the signal voltage is less than that of said second reference voltage, said output means of each branch providing pulses only when the corresponding unilateral conducting means is forward biased, and an indicator coupled to both of said output means.

2. A device for indicating whether or not a system parameter has exceeded prescribed operating limits comprising transducer means for converting said parameter into an alternating current signal voltage of magnitude proportional to the magnitude of said parameter, detector means having first and second branches each receptive of said signal voltage, said first branch including input means for receiving a first alternating current reference voltage whose magnitude is adjusted to a value representative of an upper limiting value for said parameter, said second branch including input means for receiving a second alternating current reference voltage of magnitude representative of a lower limiting value for said parameter, the phase of said reference voltages being opposite to that of said signal voltage, each of said branches further including unilateral conducting means and a capacitor coupled to said signal input voltage and to the corresponding reference voltage whereby a potential is established across said capacitor, each branch including an output means connected in series with said unilateral conducting means, said unilateral conducting means in said first branch being reverse biased when the magnitude of the signal voltage is greater than that of said first reference voltage, said unilateral conducting means in said second branch being reverse biased when the magnitude of the signal voltage is less than that of said second reference voltage, said output means of each branch providing pulses only when the corresponding unilateral conducting means is forward biased, said pulses at each output means alternating in time with the pulses from the other of said output means, and an indicator coupled to both of said output means.

3. A system for indicating whether or not a system parameter has exceeded prescribed operating limits comprising transducer means for converting said parameter into an alternating current signal voltage of magnitude proportional to the magnitude of said parameter, detector means having first and second branches each receptive of said signal voltage, said first branch including input means for receiving a first alternating current reference voltage whose magnitude is adjusted to a value representative of an upper limiting value for said parameter, said second branch including input means for receiving a second alternating current reference voltage of magnitude representative of a lower limiting value for said parameter, each of said branches further including a pair of oppositely connected unilateral conducting means and a capacitor coupled through said pair of unilateral conducting means to said signal voltage and to the corresponding reference voltage, respectively whereby a potential is established across said capacitor of each branch which approaches the peak value of the higher of said signal voltage and said corresponding reference voltage, said potential having a polarity relative to said corresponding reference voltage dependent upon the manner of connection of said unilateral conducting means in said branch, resistive means associated with said capacitor for discharging said capacitor, the time constant of the discharge of said capacitor being long compared with the period of said voltages, each branch including an output means connected in series with one of said unilateral conducting means, said output means of said first branch being deenergized only when said input signal voltage is larger than said first reference voltage, said output means of said second branch being deenergized only when said input signal voltage is smaller than said second reference voltage, and indicating means coupled to the output means of said branches for providing a distinct indication whenever the magnitude of the aforesaid system parameter is outside the prescribed limits established by said reference voltages.

4. A system for indicating whether or not a system parameter has exceeded prescribed operating limits comprising transducer means for converting said parameter into an alternating current signal voltage of magnitude proportional to the magnitude of said parameter, detector means having first and second branches each receptive of said signal voltage, said first branch including input means for receiving a first alternating current reference voltage whose magnitude is adjusted to a value representative of an upper limiting value for said parameter, said second branch including input means for receiving a second alternating current reference voltage of magnitude representative of a lower limiting value for said parameter, the phase of said reference voltages being opposite to that of said signal voltage, each of said branches further including a pair of oppositely connected unilateral conducting means and a capacitor coupled through said first unilateral conducting means to said signal voltage and through said other unilateral conducting means to the corresponding reference voltage whereby a potential is established across said capacitor, resistive means associated with said capacitor for discharging said capacitor, the time constant of the discharge of said capacitor being long compared with the period of said voltages, each branch including an output means connected in series with one of said unilateral conducting means, said output means of said first branch being deenergized only when said input signal voltage is larger than said first reference voltage, said output means of said second branch being deenergized only when said input signal voltage is smaller than said second reference voltage, and indicating means coupled to the output means of said branches for providing a distinct indication whenever the magnitude of the aforesaid system parameter is outside the prescribed limits established by said reference voltages.

5. A system as in claim 4 wherein said output means of said first and second branches is energized during different alternate half-cycles of said signal voltage.

6. A device for indicating whether or not a system parameter has exceeded prescribed operating limits comprising transducer means for converting said parameter into an alternating current signal voltage of magnitude proportional to the magnitude of said parameter, detector means having first and second branches each receptive of said signal voltage, said first branch including input means for receiving a first alternating current reference voltage whose magnitude is adjusted to a value representative of an upper limiting value for said parameter, said second branch including input means for receiving a second alternating current reference voltage of magnitude representative of a lower limiting value for said parameter, the phase of said reference voltages being opposite to that of said signal input voltage, each of said branches further including a pair of oppositely connected unilateral conducting means and a capacitor coupled through said first unilateral conducting means to said signal voltage and through said other unilateral conducting means to the corresponding reference voltage whereby a potential is established across said capacitor, resistive means associated with said capacitor for discharging said capacitor at a rate which is slow compared with the period of said voltages, each branch including an output means connected in series with one of said unilateral conducting means, said one unilateral conducting means in series with the output means in said first branch being reverse biased when the magnitude of the signal voltage is greater than that of said first reference voltage, said one unilateral conducting means in series with the output means of said second branch being reverse biased when the magnitude of the signal voltage is less than that of said second reference voltage, said output means of each branch providing pulses when energized which alternate in time with those at the other of said output means, and an indicator coupled to said output means.

7. A device for indicating whether or not a system parameter has exceeded prescribed operating limits comprising transducer means for converting said parameter into an alternating current signal voltage of magnitude proportional to the magnitude of said parameter, detector means having first and second branches each receptive of said signal voltage, said first branch including input means for receiving a first alternating current reference voltage whose magnitude is adjusted to a value representative of an upper limiting value for said parameter, said second branch including input means for receiving a second alternating current reference voltage of magnitude representative of a lower limiting value for said parameter, the phase of said reference voltages being opposite to that of said signal input voltage, each of said branches further including a pair of oppositely connected unilateral conducting means and a capacitor coupled through said first unilateral conducting means to said signal voltage and through said other unilateral conducting means to the corresponding reference voltage whereby a potential is established across said capacitor, resistive means associated with said capacitor for discharging said capacitor at a rate which is slow compared with the period of said voltages, each branch including an output means connected in series with one of said unilateral conducting means, said one unilateral conducting means in series with the output means in said first branch being reverse biased when the magnitude of the signal voltage is less than that of said first reference voltage, said one unilateral conducting means in series with the output means of said second branch being reverse biased when the magnitude of the signal voltage is greater than that of said second reference voltage, said output means of each branch providing pulses when energized which alternate in time with those at the other of said output means, and an indicator coupled to said output means.

8. A device for indicating whether or not a system parameter has exceeded prescribed operating limits comprising transducer means for converting said parameter into an alternating current signal voltage of magnitude proportional to the magnitude of said parameter, detector means having first and second branches each receptive of said signal voltage, said first branch including input means for receiving a first alternating current reference voltage whose magnitude is adjusted to a value representative of an upper limiting value for said parameter, said second branch including input means for receiving a second alternating current reference voltage of magnitude representative of a lower limiting value for said parameter, the phase of said reference voltages being opposite to that of said signal input voltage, each of said branches further including a pair of oppositely connected unilateral conducting means and a capacitor coupled through said first unilateral conducting means to said signal voltage and through said other device to the corresponding reference voltage whereby a potential is established across said capacitor, resistive means assoicated with said capacitor for discharging said capacitor at a rate which is slow compared with the period of said voltages, each branch including an output means connected in series with one of said unilateral conducting means, said unilateral conducting means in series with said output means of each of said branches being polarized in one direction when the magnitude of the signal voltage exceeds that of the reference voltage applied to that branch and in the opposite direction when the magnitude of the signal voltage is within prescribed limits established by said reference voltages, said output means of each branch providing pulses when energized which alternate in time with those at the other of said output means, and an indicator coupled to said output means.

9. A device for indicating whether or not a system parameter has exceeded prescribed operating limits comprising transducer means for converting said parameter into an alternating current signal voltage of magnitude proportional to the magnitude of said parameter, detector means having first and second branches each receptive of said signal voltage, said first branch including input means for receiving a first alternating current reference voltage whose magnitude is adjusted to a value representative of an upper limiting value for said parameter, said second branch including input means for receiving a second alternating current reference voltage of magnitude representative of a lower limiting value for said parameter, the phase of said reference voltages being opposite to that of said signal voltage, each of said branches further including a pair of oppositely connected unilateral conducting means and a capacitor coupled through said first unilateral conducting means to said signal input voltage and through said other unilateral conducting means to the corresponding reference voltage whereby a potential is established across said capacitor, resistive means associated with said capacitor for discharging said capacitor, the time constant of the discharge of said capacitor being long compared with the period of said voltages, each branch including an output means connected in series with one of said unilateral conducting means, said unilateral conducting means in series with said output means of each of said branches being polarized in one direction when the magnitude of the signal voltage exceeds that of the reference voltage applied to that branch and in the opposite direction when the magnitude of the signal voltage is within prescribed limits established by said reference voltages, said output means of said first and second branches being energized during different alternate half-cycles of said signal voltage, said output means of each branch providing pulses when energized which alternate in time with those of the other of said output means, a flip-flop device having a pair of output circuits and first and second input circuits coupled to the output means of said first and second branches respectively, and indicator means coupled to at least one of said output means for indicating the presence or absence of flip-flop action in said flip-flop device.

10. A device for indicating whether or not a system parameter has exceeded prescribed operating limits comprising transducer means for converting said parameter into an alternating current signal voltage of magnitude proportional to the magnitude of said parameter, detector means having first and second branches each receptive of said signal voltage, said first branch including input means for receiving a first alternating current reference voltage whose magnitude is adjusted to a value representative of an upper limiting value for said parameter, said second branch including input means for receiving a second alternating current reference voltage of magnitude representative of a lower limiting value for said parameter, the phase of said reference voltages being opposite to that of said signal voltage, each of said branches further including a pair of oppositely connected unilateral conducting means and a capacitor coupled through said first unilateral conducting means to said signal input voltage and through said other unilateral conducting means to the corresponding reference voltage whereby a potential is established across said capacitor, resistive means associated with said capacitor for discharging said capacitor, the time constant of the discharge of said capacitor being long compared with the period of said voltages, each branch including an output means connected in series with one of said unilateral conducting means, said one unilateral conducting means in series with the output means in said first branch being reverse biased when the magnitude of the signal voltage is greater than that of said first reference voltage, said one unilateral conducting means in series with the output means of said second branch being reverse biased when the magnitude of the signal voltage is less than that of said second reference voltage, said output means of said first and second branches being energized during different alternate half-cycles of said signal voltage, said output means of each branch providing pulses when energized which alternate in time with those of the other of said output means, a flip-flop device having a pair of output circuits and first and second input circuits coupled to the output means of said first and second branches respectively, and indicator means coupled to at least one of said output means for indicating the presence or absence of flip-flop action in said flip-flop device.

11. A detector circuit having first and second branches each receptive of an alternating current signal input voltage, said first branch including input means for receiving a first alternating current reference voltage, said second branch including input means for receiving a second alternating current reference voltage, the phase of said reference voltages being opposite to that of said signal input voltage, each of said branches further including a pair of oppositely connected unilateral conducting means and a capacitor coupled through said first unilateral conducting means to said signal input voltage and through said other unilateral conducting means to the corresponding reference voltage whereby a potential is established across said capacitor of each branch which approaches the peak value of the higher of said signal voltage and said corresponding reference voltage, said potential having a polarity dependent upon the manner of connection of said unilateral conducting means in said branch, resistive means associated with said capacitor for discharging said capacitor, the time constant of the discharge of said capacitor being long compared with the period of said voltages, each branch including an output means connected in series with one of said unilateral conducting means, said output means of said first branch being deenergized only when said input signal voltage is larger than said first reference voltage, said output means of said second branch being deenergized only when said input signal voltage is smaller than said second reference voltage.

References Cited in the file of this patent

UNITED STATES PATENTS

| | | |
|---|---|---|
| 2,418,284 | Winchel et al. | Apr. 1, 1947 |
| 2,529,723 | Chevallier | Nov. 14, 1950 |
| 2,715,718 | Holtje | Aug. 16, 1955 |
| 3,029,423 | Koranye | Apr. 10, 1962 |